US011023769B2

(12) United States Patent
Qian et al.

(10) Patent No.: US 11,023,769 B2
(45) Date of Patent: Jun. 1, 2021

(54) MODIFYING AN IMAGE BASED ON IDENTIFYING A FEATURE

(71) Applicant: LENOVO (Singapore) PTE. LTD., New Tech Park (SG)

(72) Inventors: Ming Qian, Cary, NC (US); Sujin Jang, Rolling Meadows, IL (US); John Weldon Nicholson, Cary, NC (US); Song Wang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 103 days.

(21) Appl. No.: 16/249,664

(22) Filed: Jan. 16, 2019

(65) Prior Publication Data

US 2020/0226409 A1 Jul. 16, 2020

(51) Int. Cl.
*G06K 9/46* (2006.01)
*G06K 9/62* (2006.01)
*G06T 7/246* (2017.01)
*G06T 7/73* (2017.01)
*G06N 3/04* (2006.01)
*G06K 9/00* (2006.01)

(52) U.S. Cl.
CPC ....... *G06K 9/4604* (2013.01); *G06K 9/00375* (2013.01); *G06K 9/6256* (2013.01); *G06N 3/0445* (2013.01); *G06T 7/246* (2017.01); *G06T 7/73* (2017.01)

(58) Field of Classification Search
CPC ............... G06K 9/4604; G06K 9/6256; G06K 9/00375; G06T 7/246; G06T 7/73; G06N 3/0445
See application file for complete search history.

(56) References Cited

U.S. PATENT DOCUMENTS

| | | | | |
|---|---|---|---|---|
| 2016/0156771 A1* | 6/2016 | Lee | ................... | G06K 9/00288 455/414.1 |
| 2018/0357789 A1* | 12/2018 | Yang | ........................ | G06T 7/74 |
| 2019/0005673 A1* | 1/2019 | Anderson | ................. | G06T 7/70 |
| 2019/0011703 A1* | 1/2019 | Robaina | .................. | G06F 3/011 |
| 2019/0251702 A1* | 8/2019 | Chandler | ................ | G06F 3/013 |
| 2020/0167949 A1* | 5/2020 | Anderson | ............ | A61B 90/361 |

OTHER PUBLICATIONS

Aditya Mavlankar et al., "An Interactive Region-Of-Interest Video Streaming System for Online Lecture Viewing", 18th International Packet Video Workshop, Dec. 13-14, 2010, pp. 1-8.
Derek Pang et al., "ClassX Mobile: region-of-interest video streaming to mobile devices with multi-touch interaction", ACM Digital Library, Proceedings of hte 19th ACM International conference on Multimedia, Nov. 28-Dec. 1, 2011, p. 1.
ClassX Team, "ClassX Mobile", YouTube, https://www.youtube.com/watch?v=Kul-oCw4hj8, May 8, 2011, p. 1.
Vimeo, "ClassX Mobile", https://vimeo.com/23622225, known about as early as Jan. 1, 2012, pp. 1-2.

* cited by examiner

*Primary Examiner* — Asghar H Bilgrami
(74) *Attorney, Agent, or Firm* — Kunzler Bean & Adamson (57) ABSTRACT

For modifying an image, a processor detects a feature in the image using a convolutional neural network trained on a feature training set. The processor further places the feature within the displayed image. The processor determines an intent for the image. In addition, the processor modifies the image based on the intent.

9 Claims, 13 Drawing Sheets

FIG. 5C

MODIFYING AN IMAGE BASED ON IDENTIFYING A FEATURE

FIELD

The subject matter disclosed herein relates to identifying a feature and more particularly relates to modifying an image based on identifying the feature.

BACKGROUND

Video systems display images of an area of interest.

BRIEF SUMMARY

An apparatus for modifying an image is disclosed. The apparatus includes a camera, a processor, and a memory. The camera captures the image. The processor detects a feature in the image using a convolutional neural network trained on a feature training set. The processor further places the feature within the displayed image. The processor determines an intent for the image. In addition, the processor modifies the image based on the intent. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
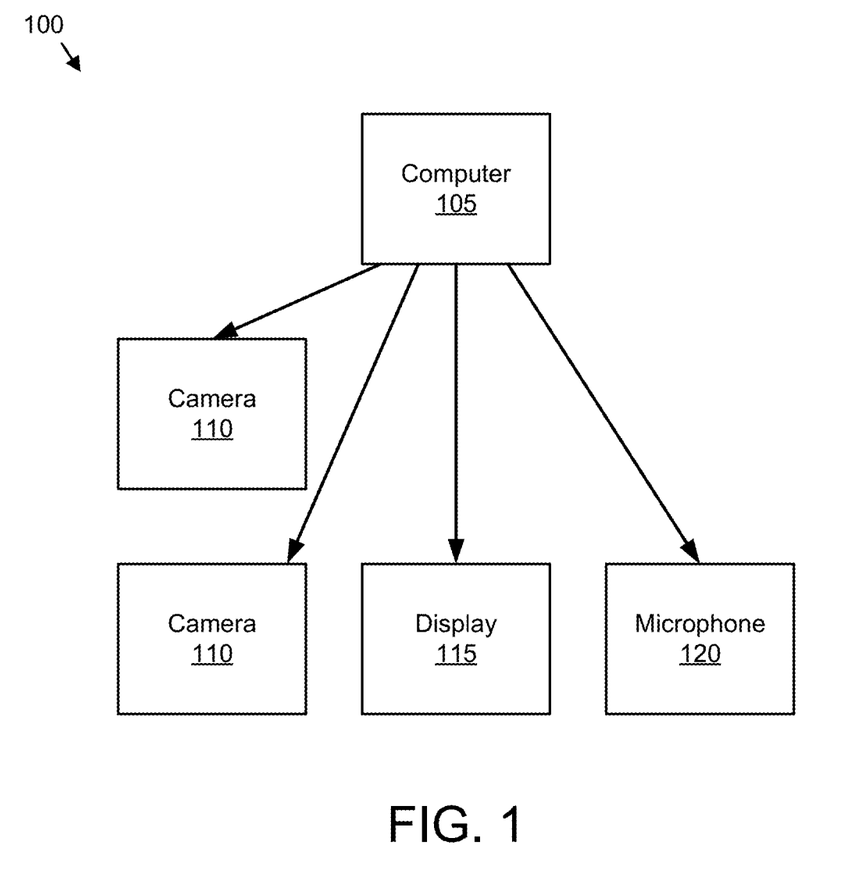
FIG. 1 is a schematic block diagram illustrating one embodiment of an image modification system.

FIG. 1 is a schematic block diagram illustrating one embodiment of an image modification system 100. The system 100 may present an image on a display 115. In addition, the system 100 may modify the image that is presented on the display 115 so that the displayed image is more useful to a user. In the depicted embodiment, the system 100 includes a computer 105, one or more cameras 110, and the display 115. In a certain embodiment, the system 100 includes a microphone 120.

The one or more cameras 110 may capture the image. The image may be of a procedure such as a medical procedure, a medical operation, a skilled procedure, and the like. The computer 105 may receive the image and present the image on the display 115 to guide the user. The user may employ the displayed image in performing the procedure. The presentation of the clear, focused, and highly detailed image may be advantageous for performing the procedure.

Displaying the useful view in the displayed image may require constant adjustment of the camera 110 and/or displayed field-of-view of the image. Unfortunately, it may be difficult and/or impractical for the user to manually adjust the field of view of the camera 110. The embodiments described herein automatically detect a feature in the image and place the feature within the displayed image on the display 115. In one embodiment, the feature is placed in the center of the display 115. In addition, the feature may be placed in a specified portion of the display 115. The embodiments may further determine an intent for the image. The intent may be the user's intent. The embodiments may automatically modify the image based on the intent. As a result, the user is presented with the desired image without manually adjusting the field of view of the camera 110 as will be described hereafter.

Figure 2A:
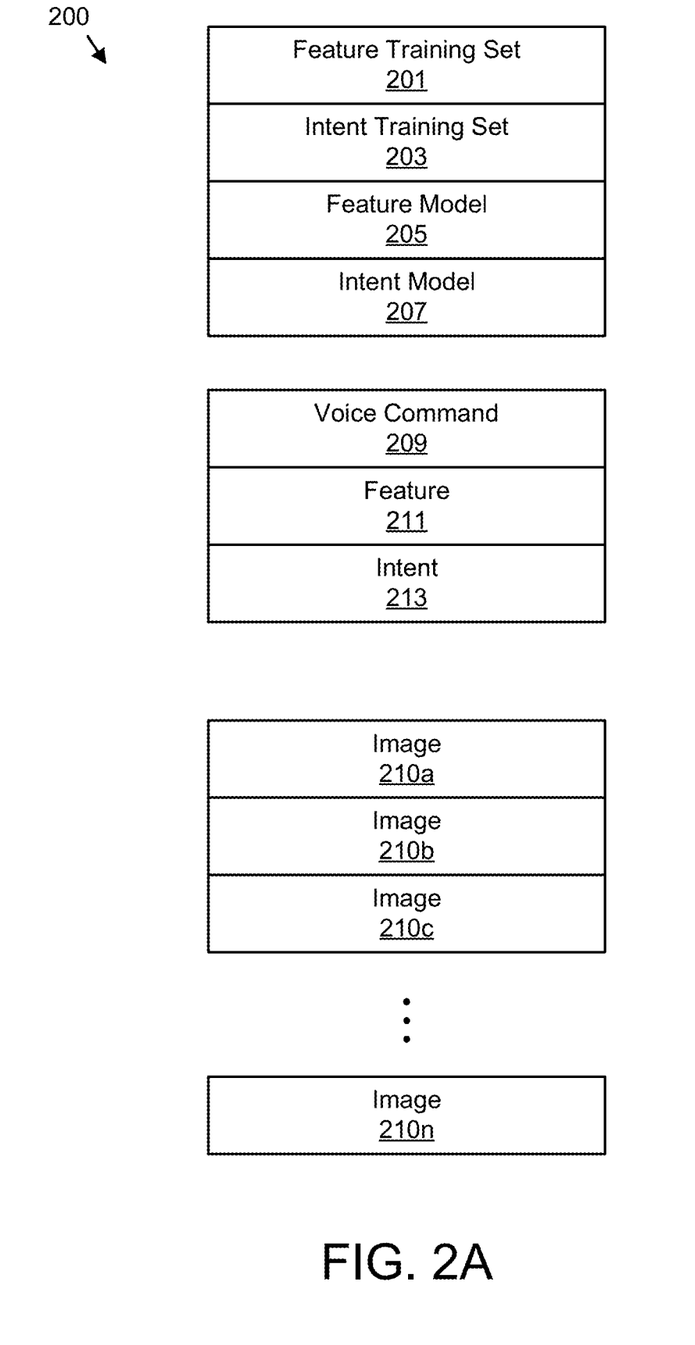
FIG. 2A is a schematic block diagram illustrating one embodiment of system data.

FIG. 2A is a schematic block diagram illustrating one embodiment of system data 200. The system data 200 maybe organized as a data set in a memory. In the depicted embodiment, the system data 200 includes a feature training set 201, an intent training set 203, a feature model 205, an intent model 207, a voice command 209, a feature 211, an intent 213, and one or more images 210 from the camera 110.

The feature training set 201 may include a plurality of images 210 of the feature 211. The feature 211 may be the portion of the image 210 that the user desires to view in the display 115. The feature 211 may be selected from the group consisting of one or more fingers, one or more fingertips, one or more gloved fingers, one or more gloved fingertips, a hand, a gloved hand, an instrument, and a tool. The feature training set 201 may include the feature 211 in a plurality of positions, orientations, sizes, dimensions, colors, environments, and the like. For example, the feature training set 201 may include images 210 of the surgeon's fingers performing a medical operation.

In one embodiment, the feature training set 201 further includes a feature identification of the feature 211 within the image 210 for each image 210. The feature identification may identify the portion of the image 210 that is the feature 211. In one embodiment, the feature identification comprises the pixels of the image 210 that are the feature 211. In an alternative embodiment, the feature identification comprises one or more vectors that outline the feature 211. In a certain embodiment, the feature identification comprises one or more vectors that form a framework centered on the feature 211.

The intent training set 203 may include a plurality of images 210 of the feature 211. The intent training set 203 may illustrate motions of the feature 211. In one embodiment, the intent training set 203 may include a plurality of video sequences comprising images 210 of the feature 211. The images 210 and/or video sequences may comprise the feature 211 indicating an intent to the camera 110. For example, the feature 211 may indicate an intent of zooming in to the camera 110. In a particular example, wherein surgeon's fingers are the feature 211, the finger features 211 may form a pattern such as widening a gap between two fingers that indicates the intent such as zooming out.

In addition, the images 210 and/or video sequences of the intent training set 203 may comprise the feature 211 performing a specified sequence in the procedure. For example, the images 210 and/or video sequences may be of the surgeon's fingers suturing an incision.

In one embodiment, the intent training set 203 includes an intent identification for each image 210 and/or video sequence. The intent identification may specify an intent 213 corresponding to each image 210 and/or video sequence. In one embodiment, the intent 213 is a null action wherein the camera 110 and/or computer 105 takes no action relative to the image 210. In one embodiment, the intent 213 is selected from the group comprising a specified zoom, a maximum zoom, keeping a door in view, a zoom in, a zoom out, following the feature, a pan left, a pan right, a pan up, and a pan down. For example, the intent 213 of zooming in may be associated with suturing the incision.

The feature model 205 may be trained from the feature training set 201. The training of the feature model 205 is described in more detail in FIG. 5C. The intent model 207 may be trained from the intent training set 203. The training of the intent model 207 is also described in more detail in FIG. 5C.

The voice command 209 may be an audible signal captured by the microphone 120. In addition, the voice command 209 may comprise a specified command identified from the audible signal. The specified command may be an intent 213.

The feature 211 may be the feature 211 identified from the image 210. FIGS. 2B-2E illustrate an example of a feature 211. The intent 213 may be the intent 213 determined for the image 210. The intent 213 may be a hand signal. In addition, the intent 213 may be a user action.

The plurality of images 210a-n may be captured by the camera 110 during the procedure. In one embodiment, the images 210a-n are organized as a plurality of temporal instances.

Figure 2B:
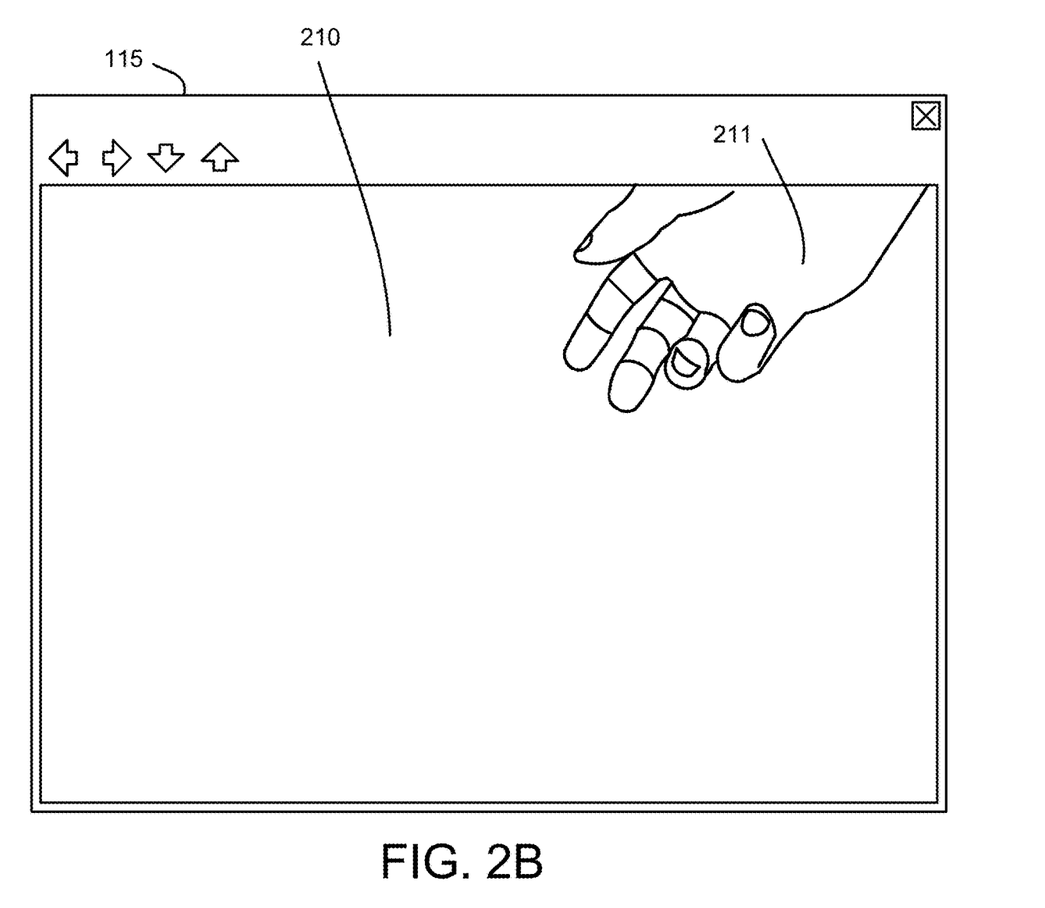
FIG. 2B is a drawing illustrating one embodiment of detecting a feature.

FIG. 2B is a drawing illustrating one embodiment of detecting a feature 211. A hand feature 211 is shown in an image 210 presented on the display 115. The embodiments may detect the feature 211 from the image 210.

Figure 2C:
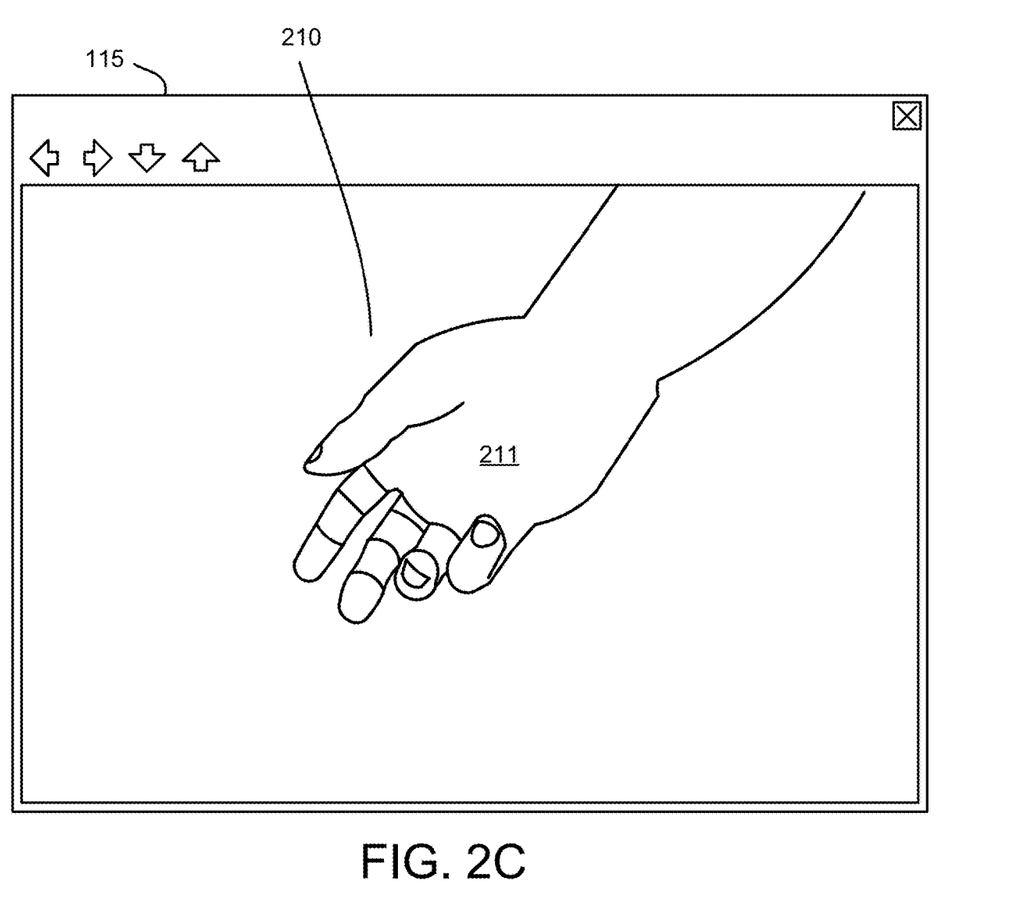
FIG. 2C is a drawing illustrating one embodiment of positioning a feature.

FIG. 2C is a drawing illustrating one embodiment of positioning the feature 211. In the depicted embodiment, the hand feature 211 of FIG. 2B is shown placed at the center of the displayed image 210 in the display 115.

Figure 2D:
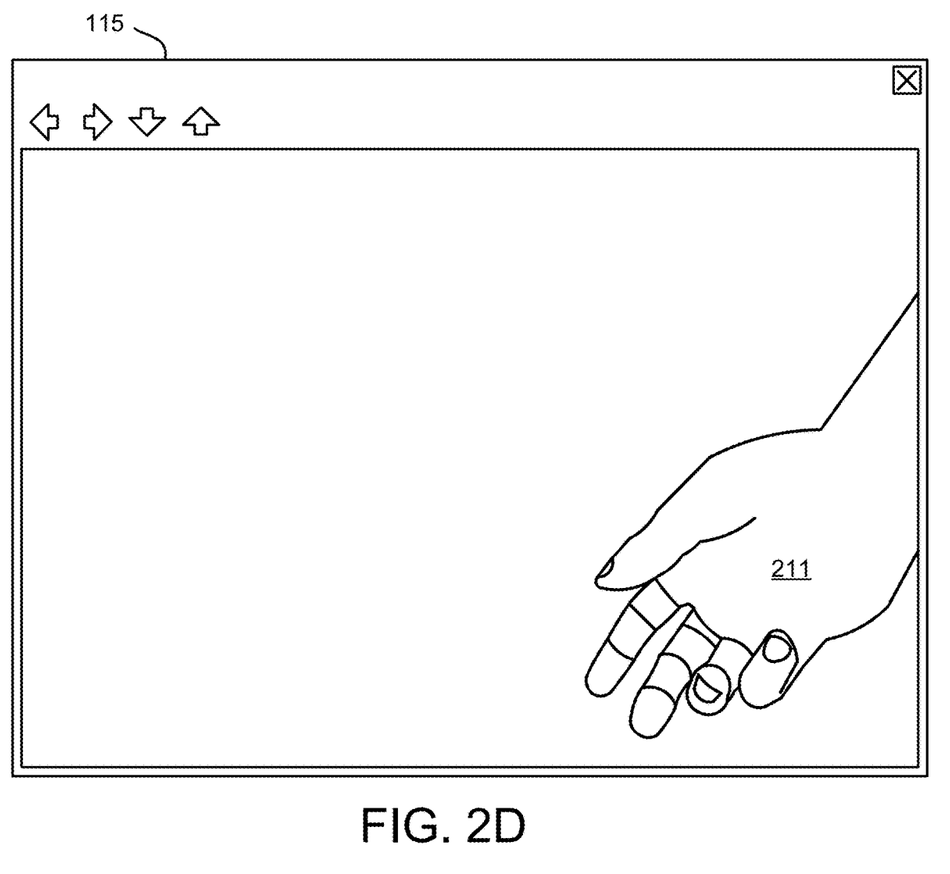
FIG. 2D is a drawing illustrating one alternate embodiment of positioning a feature.

FIG. 2D is a drawing illustrating one alternate embodiment of positioning the feature 211. In the depicted embodiment, the hand feature 211 of FIG. 2B is shown placed in a specified lower right corner of the displayed image 210 in the display 115.

Figure 2E:
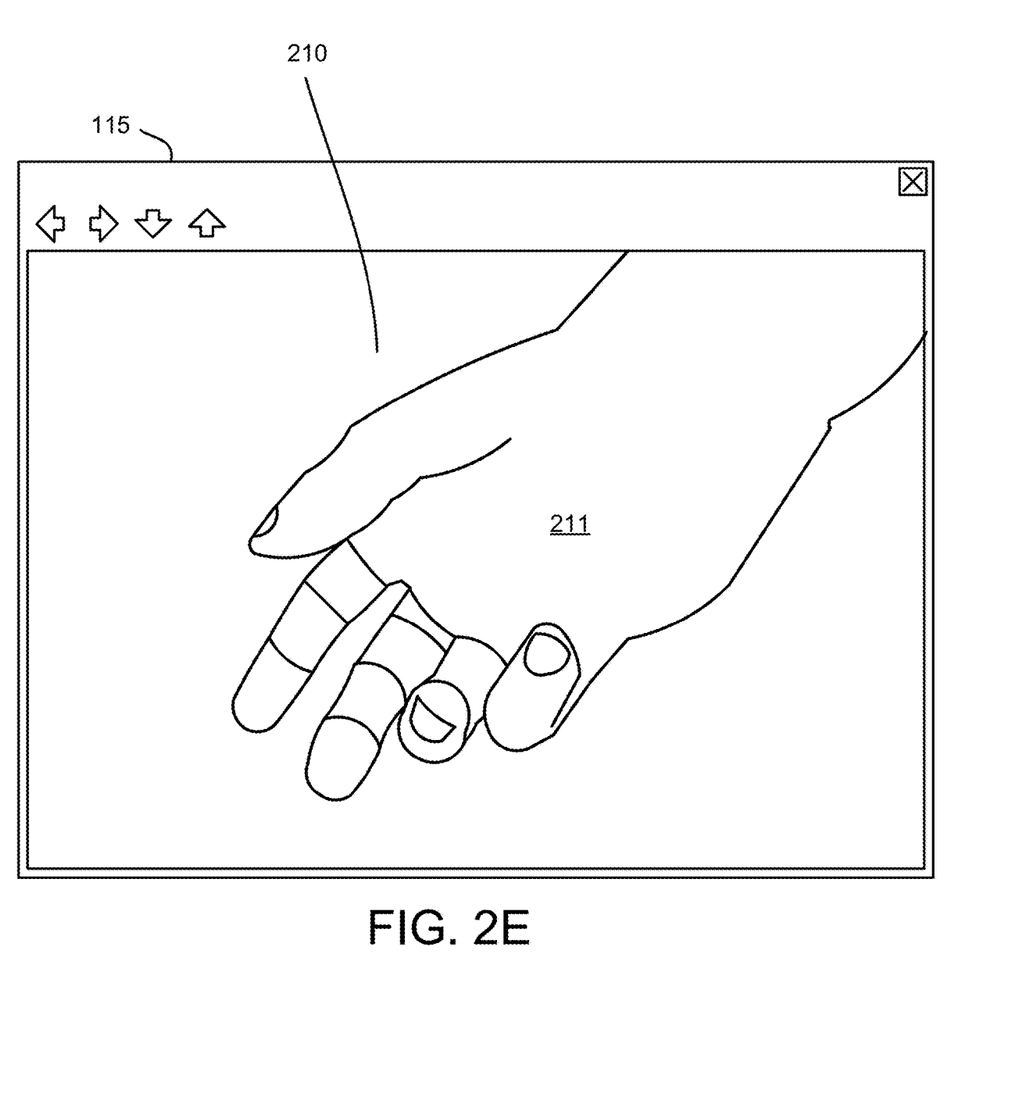
FIG. 2E is a drawing illustrating one embodiment of modifying a displayed image.

FIG. 2E is a drawing illustrating one embodiment of modifying a displayed image 210. In the depicted embodiment, the displayed image 210 of FIG. 2C is modified by zooming in on the hand feature 211.

Figure 3A:
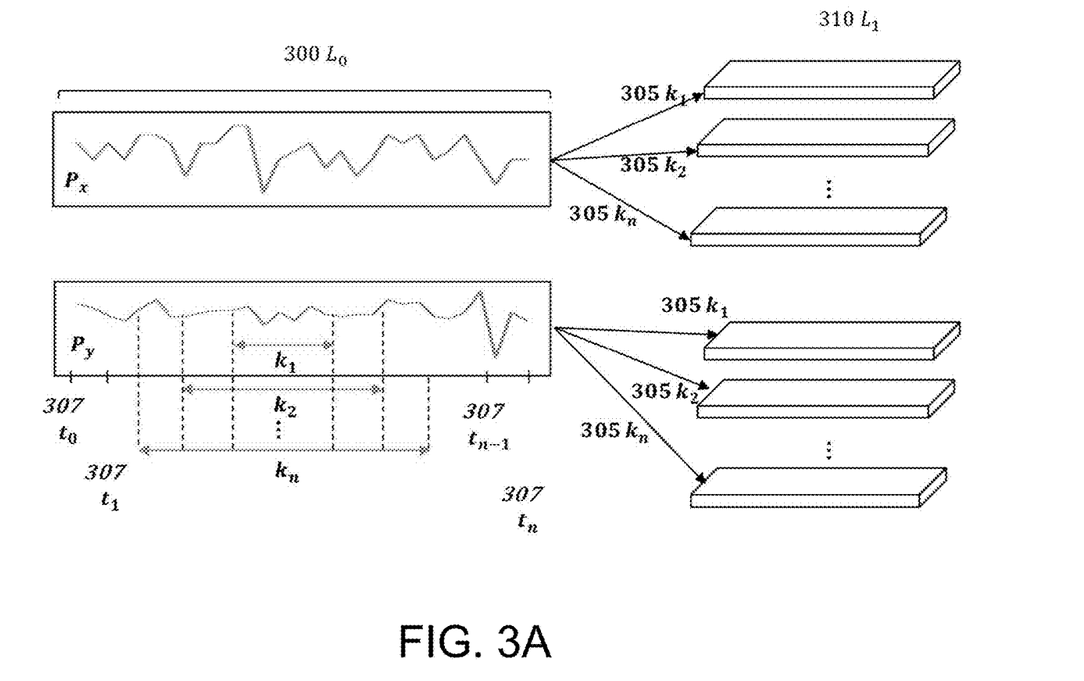
FIGS. 3A-B are schematic diagrams illustrating one embodiment of a detection process.
Figure 3B:
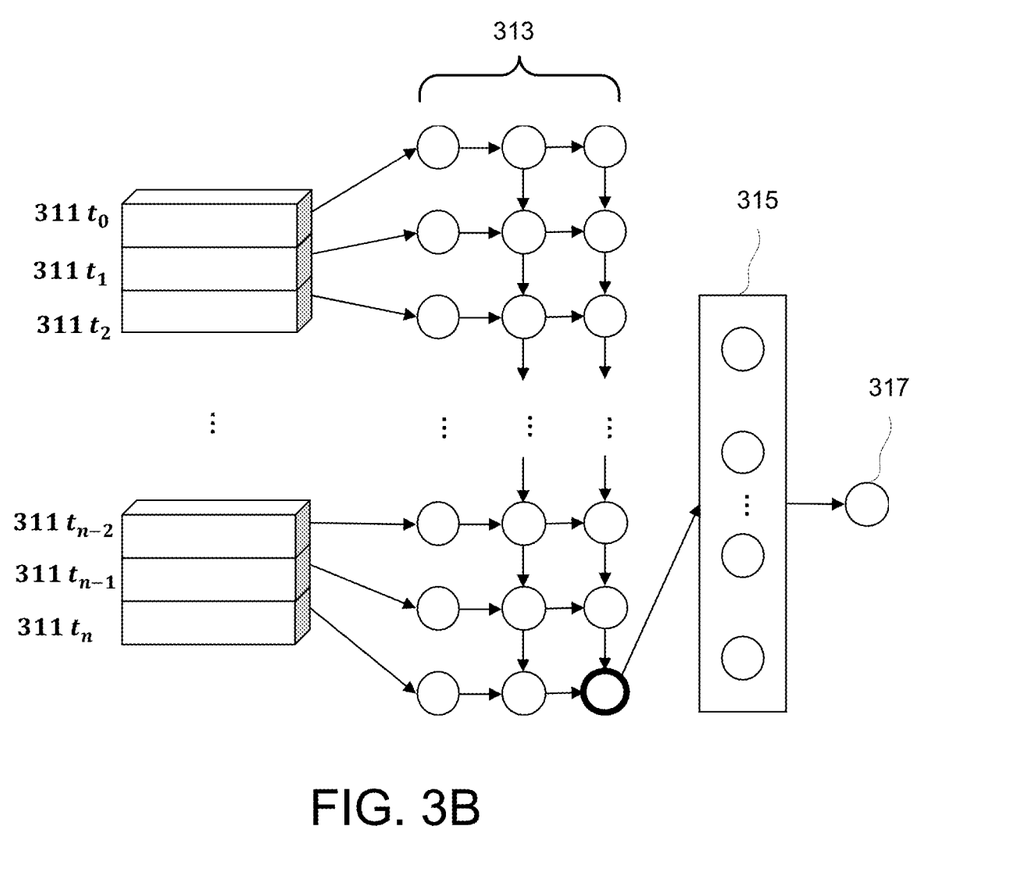

FIGS. 3A-B are schematic diagrams illustrating one embodiment of a detection process. The process may detect the feature 211 within one or more images 210. In the depicted embodiment of FIG. 3A, the images 210 are represented as pixel position data $L_0$ 300 in two-dimensional space. The two-dimensional space may comprise x-axis position data $P_x$ and y-axis position data $P_y$ for a plurality of temporal instances t of the images 210. In one embodiment, the x-axis position data $P_x$ and/or the y-axis position data $P_y$ are scaled to one of two or more window sizes of temporal instances. The x-axis position data $P_x$ and/or the y-axis position data $P_y$ may be sampled with the window sizes. In the depicted embodiment, each window size k is a one-dimensional kernel of varying lengths. A plurality of temporal instances of the feature 211 may be scaled to one of two or more window sizes. For example, a first temporal instance of the feature 211 may be scaled to window sample $k_1$ 305 of a first window size k and a second temporal instance of the feature 211 may be scaled to window sample $k_2$ 305 of a second window size k.

The window samples $k_x$ 305 may be input to one or more convolutional neural networks $L_2$ 310. The convolutional neural networks 310 may be trained on the feature model 205 and/or the intent model 207. In one embodiment, each convolutional neural network is coupled with a Rectified Linear Unit (ReLU) layer. Each convolutional neural network and/or ReLU combination 310 may generate a temporal slice. The temporal slice is shown in FIG. 3B. Each temporal slice may be flattened across a time interval t. In one embodiment, each temporal slice is a temporal instance of the feature 211.

In the depicted embodiment of FIG. 3B, the temporal slices $t_x$ 311 from each convolutional neural network and/or ReLU combination 310 is input into a recurrent neural network 313. The recurrent neural network 313 may be trained on motions of the feature 211. In one embodiment, recurrent neural network 313 is trained on the feature model 205 and/or the intent model 207. In a certain embodiment, the recurrent neural network 313 is a Long Short Term Memory (LSTM) neural network 313. In the depicted embodiment, the recurrent neural network 313 is a stacked LSTM 313.

In the depicted embodiment, the output of the recurrent neural network 313 is input to a normalized exponential function and/or softmax function 315. The output 317 of the softmax function 315 may identify the feature 211 and/or the intent 213.

Figure 4A:
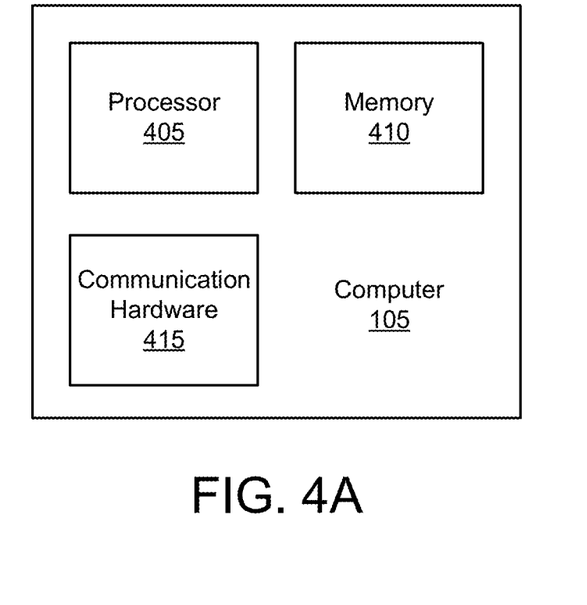
FIG. 4A is a schematic block diagram illustrating one embodiment of a computer.

FIG. 4A is a schematic block diagram illustrating one embodiment of the computer 105. In the depicted embodiment, the computer 105 includes a processor 405, a memory 410, and communication hardware 415. The memory 410 may include a semiconductor storage device, a hard disk drive, an optical storage device, a micromechanical storage device, or combinations thereof. The memory 410 may store code. The processor 405 may execute the code. The communication hardware 415 may communicate with other devices such as the camera 110, the display 115, and/or the microphone 120.

Figure 4B:
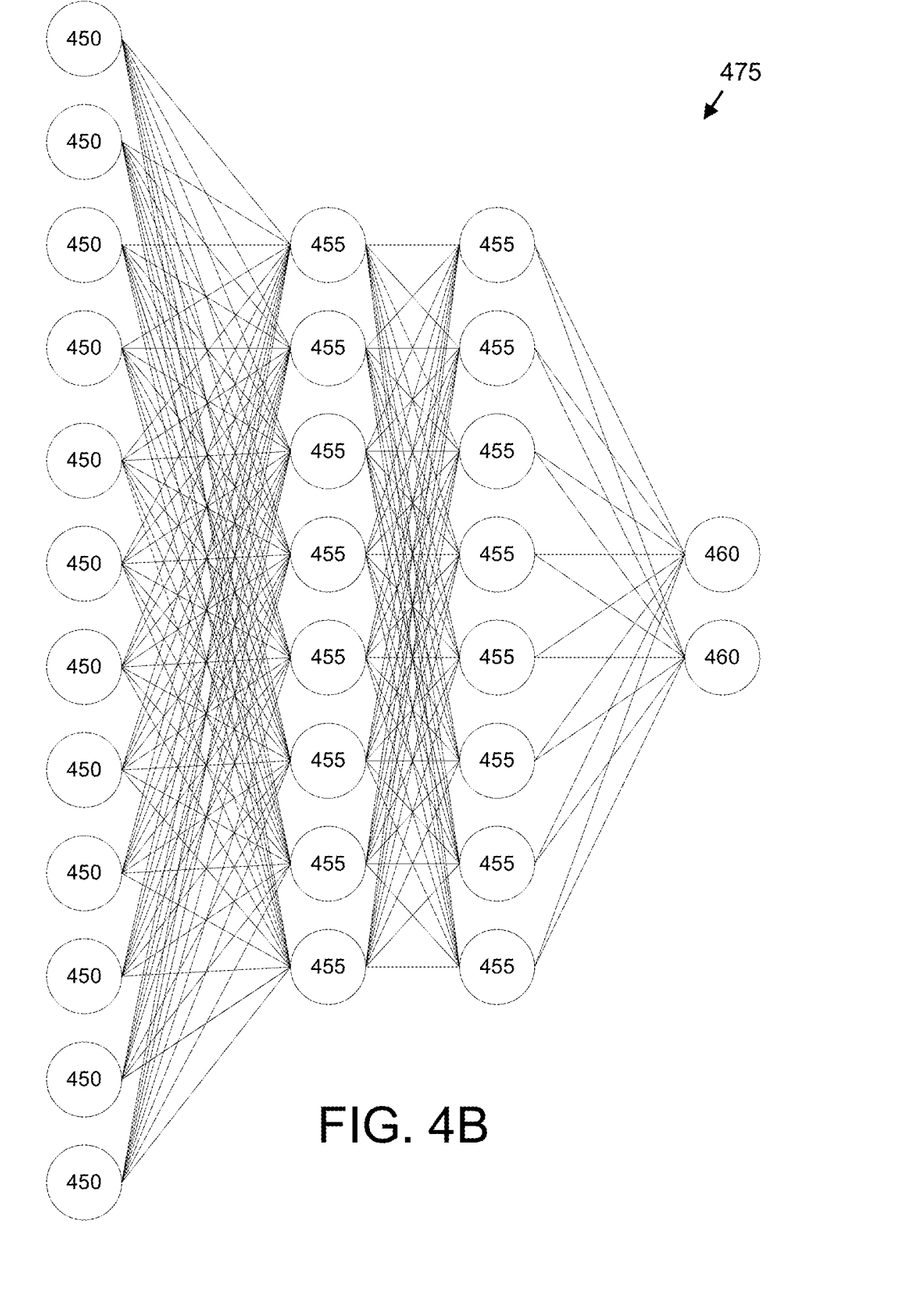
FIG. 4B is a schematic block diagram illustrating one embodiment of a neural network.

FIG. 4B is a schematic block diagram illustrating one embodiment of a neural network 475. The neural network 475 may be the convolutional neural network 310. A plurality of neural networks 475 may be incorporated in the recurrent neural network 313/LSTM neural network 313/ stacked LSTM neural network 313. In the depicted embodiment, the neural network 475 includes input neurons 450, hidden neurons 455, and output neurons 460.

The neural network 475 may be trained with training data. The training data may include the feature training set 201 and/or the intent training set 203. The neural network 475 may be trained using one or more learning functions while applying the training data to the input neurons 450 and known result values for the output neurons 460 such as the feature identification and/or intent identification of the feature training set 201 and intent training set 203 respectively. Subsequently, the neural network 465 may receive actual data such as the images 210 at the input neurons 450 and detect the feature 211 and/or determine the intent 213 at the output neurons 460 based on one or more images 210.

Figure 5A:
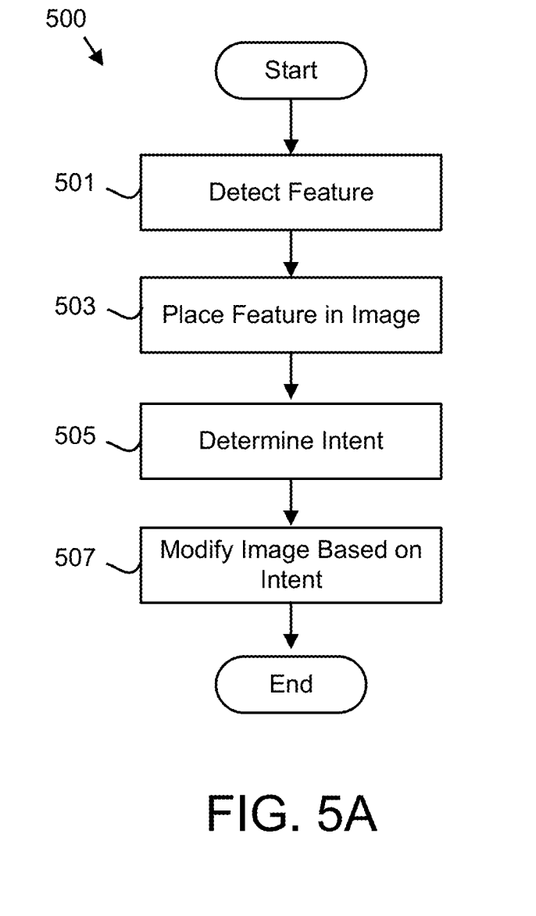
FIG. 5A is a schematic flow chart diagram illustrating one embodiment of an image modification method.

FIG. 5A is a schematic flow chart diagram illustrating one embodiment of an image modification method 500. The method 500 may detect the feature 211 in the image 210. In addition, the method 500 may determine the intent 213 for the image 210 and modify the image 210 based on the intent 213. The method 500 may be performed by the system 100, the computer 105, and/or the processor 405. The processor 405 may employ the convolutional neural network and/or ReLU 310, recurrent neural network 313/LSTM neural network 313, and combinations thereof.

The method 500 starts, and in one embodiment, the processor 405 detects 501 the feature 211 in the image 210 using the convolutional neural network 310 trained on the feature training set 201. The convolutional neural network and/or ReLU 310, the recurrent neural network 313, LSTM neural network 313, or combinations thereof may employ the feature model 205 to detect 501 the feature 211.

The image 210 may be captured by the camera 110. In addition, the camera 210 may capture a sequence of images 210. The sequence of images 210 may be a temporal sequence and comprise a plurality of temporal instances.

In one embodiment, a plurality of temporal instances t of the feature 211 are each scaled to one of two or more window sizes k and input into the convolutional neural network 310 as window samples 305 as illustrated in FIG. 3A. The temporal slices 311 may detect 501 the feature 211.

In one embodiment, the output by the convolutional neural network and/or ReLU 310 may be input into the recurrent neural network 313/LSTM neural network 313. The output of the recurrent neural network 313/LSTM neural network 313 may be processed by the softmax function 315 and the output 317 of the softmax function 315 may detect 501 the feature 211.

In a certain embodiment, the neural network 475 is employed to detect 501 the feature 211. In addition, only the convolutional neural network and/or ReLU 310 may be employed to detect 501 the feature 211.

The processor 405 may place 503 the feature 211 within the displayed image 210 on the display 115. In one embodiment, the feature 211 is placed 503 in the center of the displayed image 210 as shown in FIG. 2C. In an alternate embodiment, the feature 211 is placed in a specified portion of the displayed image 210 on the display 115. For example, the feature 211 may be placed in a lower right quadrant of the displayed image 210 as shown in FIG. 2D.

The processor 405 may determine 505 the intent 213 for the image 210. In one embodiment, the intent 213 is determined 505 in response to the voice command 209. For example, the processor 405 may identify a specified command from an audible signal captured by the microphone 120. The processor 405 may further determine 505 the specified command to be the intent 213.

In one embodiment, the processor 405 determines 505 the intent 213 using the recurrent neural network 313 trained on an intent training set 203 comprising motions of the feature 211. The determination 505 of the intent 213 is described in more detail in FIG. 5B.

In one embodiment, one or more of the convolutional neural network and/or ReLU 310, the recurrent neural network 313, and/or LSTM neural network 313 are trained using the intent training set 203. The convolutional neural network and/or ReLU 310, the recurrent neural network 313, and/or LSTM neural network 313 may employ the intent model 207 to determine 505 the intent 213. In a certain embodiment, separate combinations of the convolutional neural network and/or ReLU 310, the recurrent neural network 313, and/or LSTM neural network 313 may be employed for detecting 501 the feature 211 and determining 505 the intent 213 respectively.

The processor 405 may modify 507 the image 210 presented by the display 115 based on the intent 213 and the method 500 ends. In one embodiment, the processor 405 directs the camera 110 to change a field-of-view, zoom in, zoom out, focus on an object, and the like. For example, if the intent 213 is a zoom in, the processor 405 may instruct the camera 110 to zoom in on the feature 211 to modify 507 the image 210 displayed by the display 115.

In one embodiment, the camera 110 captures a wide field-of-view and the processor 405 and modifies 507 the image 210 by selecting a portion of the field-of-view to be presented by the display 115.

Figure 5B:
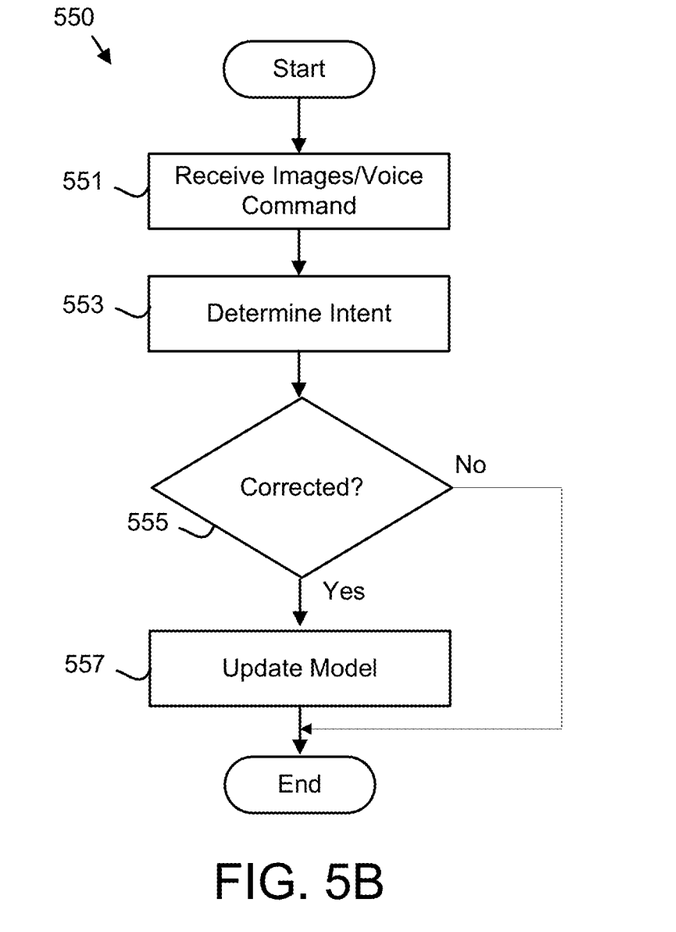
FIG. 5B is a schematic flow chart diagram illustrating one embodiment of an intent determination method.

FIG. 5B is a schematic flow chart diagram illustrating one embodiment of an intent determination method 550. The method 550 may determine the intent 213. The method 550 may perform step 505 of FIG. 5A. The method 550 may be performed by the system 100, the computer 105, and/or the processor 405. The processor 405 may employ the convolutional neural network and/or ReLU 310, recurrent neural network 313/LSTM neural network 313, and combinations thereof.

The method 550 starts, and in one embodiment, the processor 405 receives 551 one or more of images 210 and a voice command 209. The processor 405 may further determine 553 the intent 213 from the images 210 and/or voice command 209.

In one embodiment, the processor 405 determines 555 if a modification to the image 210 was corrected. For example, if the processor 405 modifies the image 210 to zoom in on the feature 211 in response to a motion of the feature 211 and the processor 405 subsequently received a voice command 209 that countermanded the modification, the processor 405 may determine 555 at the modification was corrected.

In response to determining 555 the correction, the processor 405 may update 557 the intent model 207 based on the correction. In addition, the processor 405 may update the intent training set 203 based on the correction. As a result, the system 100 learns to better determine the intent 213. If no correction is determined 555, the method 550 ends.

Figure 5C:
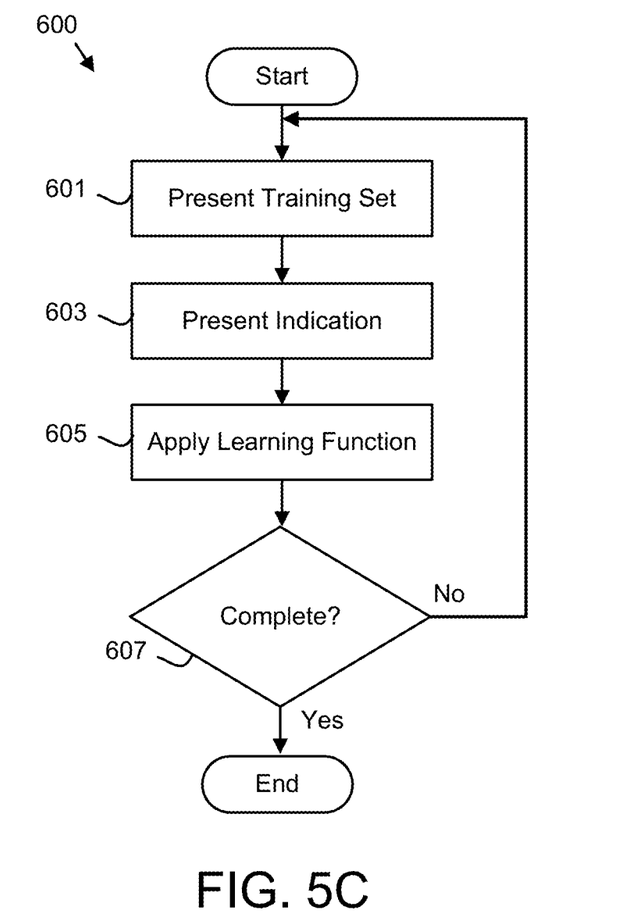
FIG. 5C is a schematic flow chart diagram illustrating one embodiment of a model training method.

FIG. 5C is a schematic flow chart diagram illustrating one embodiment of a model training method 600. The method 600 may train the feature model 205 and/or the intent model 207. The method 600 may be performed by the system 100, the computer 105, and/or the processor 405. The processor 405 may employ the convolutional neural network and/or ReLU 310, recurrent neural network 313/LSTM neural network 313, and combinations thereof.

The method 600 starts, and in one embodiment, the processor 405 presents 601 a training set such as the feature training set 201 and/or intent training set 203 to one or more of the convolutional neural network and/or ReLU 310, recurrent neural network 313/LSTM neural network 313. The processor 405 may further present 603 an indication such as the feature indication of the feature training set 201 and/or the intent indication of the intent training set 203 to the convolutional neural network and/or ReLU 310, recurrent neural network 313/LSTM neural network 313, and/or softmax 315.

In one embodiment, the processor 405 applies 605 a learning function to one or more of the convolutional neural network and/or ReLU 310, recurrent neural network 313/LSTM neural network 313 and/or softmax 315. The learning function may be a back propagation function or the like. The processor 405 may further determine 607 if the learning is complete. If the learning is not complete, the processor 405 loops to continue presenting 601 training sets. If the learning is complete, the method 600 ends.

The embodiments automatically detect a feature 211 in an image 210 and place the feature 211 within a displayed image 210 on a display 115. As a result, the embodiments automatically track the feature 211, such as for a user performing a procedure. The embodiments further determine an intent 213 for the image 210 and modify the displayed image 210 based on the intent 213. As a result, the embodiments may automatically perform modifications such as zooming in, zooming out, keeping the door in view, and the like based on the determined intent 213. The embodiments enhance the performance of the procedure by continually presenting the desired view of the feature 211 to a user and/or automated system.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a camera that captures an image;
a processor;
a memory that stores code executable by the processor to:
detect a feature in the image using a convolutional neural network trained on a feature training set, wherein the feature is selected from the group consisting of one or more fingers, one or more fingertips, one or more gloved fingers, one or more gloved fingertips, a hand, a gloved hand, an instrument, and a tool;
place the feature at a center of a displayed image;
determine an intent from a voice command using a recurrent neural network trained on motions of the feature for the image, wherein intent is selected from the group comprising a specified zoom, a maximum zoom, a zoom in, a zoom out, following the feature, a pan left, a pan right, a pan up, and a pan down, and the recurrent neural network is a Long Short Term Memory (LSTM) neural network that receives a plurality of temporal instances of the feature; and
modify the displayed image based on the intent, wherein the plurality of temporal instances of the feature are each scaled to one of two or more window sizes and each window size is a one dimensional kernel of a specified length.

2. A method comprising:
detecting, by use of a processor, a feature in an image using a convolutional neural network trained on a feature training set, wherein the feature is selected from the group consisting of one or more fingers, one or more fingertips, one or more gloved fingers, one or more gloved fingertips, a hand, a gloved hand, an instrument, and a tool;
placing the feature at a center of a displayed image;
determining an intent from a voice command using a recurrent neural network trained on motions of the feature for the image, wherein intent is selected from the group comprising a specified zoom, a maximum zoom, a zoom in, a zoom out, following the feature, a pan left, a pan right, a pan up, and a pan down, and the recurrent neural network is a Long Short Term Memory (LSTM) neural network that receives a plurality of temporal instances of the feature; and
modifying the displayed image based on the intent, wherein the plurality of temporal instances of the feature are each scaled to one of two or more window sizes and each window size is a one dimensional kernel of a specified length.

3. A program product comprising a computer readable storage medium that stores code executable by a processor, the executable code comprising code to:

detect a feature in an image using a convolutional neural network trained on a feature training set, wherein the feature is selected from the group consisting of one or more fingers, one or more fingertips, one or more gloved fingers, one or more gloved fingertips, a hand, a gloved hand, an instrument, and a tool;

place the feature at a center of a displayed image;

determine an intent from a voice command using a recurrent neural network trained on motions of the feature for the image, wherein intent is selected from the group comprising a specified zoom, a maximum zoom, a zoom in, a zoom out, following the feature, a pan left, a pan right, a pan up, and a pan down, and the recurrent neural network is a Long Short Term Memory (LSTM) neural network that receives a plurality of temporal instances of the feature; and modify the displayed image based on the intent, wherein the plurality of temporal instances of the feature are each scaled to one of two or more window sizes and each window size is a one dimensional kernel of a specified length.

4. The apparatus of claim 1, wherein the convolutional neural network generates a temporal slice that is flattened across a time interval and the flattened temporal slice is input into the recurrent neural network.

5. The apparatus of claim 1, wherein the camera captures a wide field-of-view and the displayed image is modified by selecting a portion of the field-of-view to be presented.

6. The method of claim 2, wherein the convolutional neural network generates a temporal slice that is flattened across a time interval and the flattened temporal slice is input into the recurrent neural network.

7. The method of claim 2, wherein a camera captures a wide field-of-view and the displayed image is modified by selecting a portion of the field-of-view to be presented.

8. The program product of claim 3, wherein the convolutional neural network generates a temporal slice that is flattened across a time interval and the flattened temporal slice is input into the recurrent neural network.

9. The program product of claim 3, wherein a camera captures a wide field-of-view and the displayed image is modified by selecting a portion of the field-of-view to be presented.

* * * * *